United States Patent
Jiang et al.

(10) Patent No.: US 8,125,878 B2
(45) Date of Patent: Feb. 28, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 746 days.

(21) Appl. No.: 12/286,218

(22) Filed: Sep. 29, 2008

(65) Prior Publication Data

US 2009/0167710 A1 Jul. 2, 2009

(30) Foreign Application Priority Data

Dec. 27, 2007 (CN) .......................... 2007 1 0305831

(51) Int. Cl.
*G06F 3/041* (2006.01)
(52) U.S. Cl. ....................................................... 369/173
(58) Field of Classification Search .................. 345/173, 345/174; 313/495; 428/1.4
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,084,933 B2 | 8/2006 | Oh et al. | |
| 7,196,463 B2 * | 3/2007 | Okai et al. ...................... 313/495 |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,532,182 B2 | 5/2009 | Tseng et al. | |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Nabil Hindi
(74) *Attorney, Agent, or Firm* — Altis Law Group, Inc.

(57) ABSTRACT

A touch panel includes a substrate, a transparent conductive layer, and a number of electrodes. The substrate includes a first surface. The transparent conductive layer is formed on the first surface. The transparent conductive layer includes a number of carbon nanotube wires. Opposite ends of each carbon nanotube wire are electrically connected to electrodes. Furthermore, a display device using the touch panel is also provided.

20 Claims, 7 Drawing Sheets

U.S. PATENT DOCUMENTS

| | | |
|---|---|---|
| 7,593,004 B2 | 9/2009 | Spath et al. |
| 7,630,040 B2 | 12/2009 | Liu et al. |
| 7,645,497 B2 * | 1/2010 | Spath et al. ............ 428/1.4 |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 * | 9/2010 | Irvin et al. ............ 345/173 |
| 7,825,911 B2 | 11/2010 | Sano et al. |
| 7,854,992 B2 | 12/2010 | Fu et al. |
| 7,947,977 B2 | 5/2011 | Jiang et al. |
| 7,956,287 B2 * | 6/2011 | Takayama et al. ........ 174/94 R |
| 2002/0089492 A1 | 7/2002 | Ahn et al. |
| 2003/0122800 A1 | 7/2003 | Yu |
| 2003/0147041 A1 | 8/2003 | Oh et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 | 12/2006 | Spath et al. |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081684 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0029292 A1 | 2/2008 | Takayama et al. |
| 2008/0088219 A1 | 4/2008 | Yoon et al. |
| 2008/0129666 A1 | 6/2008 | Shimotono et al. |
| 2008/0138589 A1 | 6/2008 | Wakabayashi et al. |
| 2008/0192014 A1 * | 8/2008 | Kent et al. ............ 345/173 |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | H06-28090 | 2/1994 |
| JP | H6-67788 | 3/1994 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |

| | | |
|---|---|---|
| JP | 2007-182357 | 7/2007 |
| JP | 2007-229989 | 9/2007 |
| JP | 2007-299409 | 11/2007 |
| JP | 2007-310869 | 11/2007 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| TW | 131955 | 4/1990 |
| TW | 341684 | 10/1998 |
| TW | 200518195 | 6/2005 |
| TW | I233570 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | 1253846 | 4/2006 |
| TW | 200622432 | 7/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |

OTHER PUBLICATIONS

Mei Zhang et al., "Strong Transparent, Multifunctional, Carbon Nanotube Sheets", Science, America, AAAS, vol. 309, pp. 1215-1219, Aug. 19, 2005.

George Gruner, "Carbon Nanonets Spark New Electronics", Scientific American, pp. 76-83, May 2007.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yu Xiang, Technique of Touch Panel & the Production of Resistance-type Touch Panel Insulation Dot, Journal of Longyan Teachers College, p. 25-26, vol. 22, No. 6, 2004.

ASM Handbook."vol. 2 Properties and Selection: Nonferrous Alloys and Special-Purpose Materials".Apr. 2007; pp. 840-853.

Wu et al."Transparent, Conductive Carbon Nanotube Films". Science,vol. 305,(2004);pp. 1273-1276.

Fan et al. "Self-Oriented Regular Arrays of Carbon Nanotubes and Their Field Emission Properties". Science, vol. 283, (1999);pp. 512-514.

Susuki et al."Investigation of physical and electric properties of silver pastes as binder for thermoelectric materials". Review of Scientific Instruments,76,(2005);pp. 023907-1 to 023907-5.

* cited by examiner

TOUCH PANEL AND DISPLAY DEVICE USING THE SAME

RELATED APPLICATIONS

This application claims all benefits accruing under 35 U.S.C. §119 from China Patent Application No. 200710305831.X, filed on 2007 Dec. 27 in the China Intellectual Property Office, the disclosure of which is incorporated herein by reference. This application is related to commonly-assigned co-pending applications entitled, "TOUCH PANEL", Ser. No. 12/286,266, filed on Sep. 29, 2008; "TOUCH PANEL AND DISPLAY DEVICE USING THE SAME", Ser. No. 12/286,181, filed on Sep. 29, 2008; "TOUCH PANEL AND DISPLAY DEVICE USING THE SAME", Ser. No. 12/286,154, filed on Sep. 29, 2008; "TOUCH PANEL AND DISPLAY DEVICE USING THE SAME", Ser. No. 12/286,189, filed on Sep. 29, 2008; "TOUCH PANEL AND DISPLAY DEVICE USING THE SAME", Ser. No. 12/286,176 filed on Sep. 29, 2008; "ELECTRONIC ELEMENT HAVING CARBON NANOTUBES", Ser. No. 12/286,143, filed on Sep. 29, 2008; "TOUCH PANEL AND DISPLAY DEVICE USING THE SAME", Ser. No. 12/286,166, filed on Sep. 29, 2008; "TOUCH PANEL AND DISPLAY DEVICE USING THE SAME", Ser. No. 12/286,178, filed on Sep. 29, 2008; "TOUCH PANEL AND DISPLAY DEVICE USING THE SAME", Ser. No. 12/286,148, filed on Sep. 29, 2008; "TOUCHABLE CONTROL DEVICE", Ser. No. 12/286,140, filed on Sep. 29, 2008; "TOUCH PANEL AND DISPLAY DEVICE USING THE SAME", Ser. No. 12/286,146, filed on Sep. 29, 2008; "TOUCH PANEL AND DISPLAY DEVICE USING THE SAME", Ser. No. 12/286,216, filed on Sep. 29, 2008; "TOUCH PANEL AND DISPLAY DEVICE USING THE SAME", Ser. No. 12/286,152, filed on Sep. 29, 2008; "TOUCH PANEL AND DISPLAY DEVICE USING THE SAME", Ser. No. 12/286,145, filed on Sep. 29, 2008; "TOUCH PANEL, METHOD FOR MAKING THE SAME, AND DISPLAY DEVICE ADOPTING THE SAME", Ser. No. 12/286,155, filed on Sep. 29, 2008; "TOUCH PANEL AND DISPLAY DEVICE USING THE SAME", Ser. No. 12/286,179, filed on Sep. 29, 2008; "TOUCH PANEL, METHOD FOR MAKING THE SAME, AND DISPLAY DEVICE ADOPTING THE SAME", Ser. No. 12/286,228, filed on Sep. 29, 2008; "TOUCH PANEL AND DISPLAY DEVICE USING THE SAME", Ser. No. 12/286,153, filed on Sep. 29, 2008; "TOUCH PANEL AND DISPLAY DEVICE USING THE SAME", Ser. No. 12/286,184, filed on Sep. 29, 2008; "METHOD FOR MAKING TOUCH PANEL", Ser. No. 12/286,175, filed on Sep. 29, 2008; "METHOD FOR MAKING TOUCH PANEL", Ser. No. 12/286,195, filed on Sep. 29, 2008; "TOUCH PANEL AND DISPLAY DEVICE USING THE SAME", Ser. No. 12/286,160, filed on Sep. 29, 2008; "TOUCH PANEL AND DISPLAY DEVICE USING THE SAME", Ser. No. 12/286,220, filed on Sep. 29, 2008; "TOUCH PANEL AND DISPLAY DEVICE USING THE SAME", Ser. No. 12/286,227, filed on Sep. 29, 2008; "TOUCH PANEL AND DISPLAY DEVICE USING THE SAME", Ser. No. 12/286,144, filed on Sep. 29, 2008; "TOUCH PANEL", Ser. No. 12/286,141, filed on Sep. 29, 2008; "TOUCH PANEL AND DISPLAY DEVICE USING THE SAME", Ser. No. 12/286,142 filed on Sep. 29, 2008; "TOUCH PANEL AND DISPLAY DEVICE USING THE SAME", Ser. No. 12/286,241, filed on Sep. 29, 2008; "TOUCH PANEL, METHOD FOR MAKING THE SAME, AND DISPLAY DEVICE ADOPTING THE SAME", Ser. No. 12/286,151, filed on Sep. 29, 2008; and "TOUCH PANEL, METHOD FOR MAKING THE SAME, AND DISPLAY DEVICE ADOPTING THE SAME", Ser. No. 12/286,219 filed on Sep. 29, 2008. The disclosures of the above-identified applications are incorporated herein by reference.

BACKGROUND

1. Field of the Invention

The present invention relates to touch panels and display devices using the same and, particularly, to a carbon-nanotube-based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (for example, a display such as a liquid crystal panel). A user of any such electronic apparatus operates it by pressing or touching the touch panel with a finger, a pen, a stylus, or a like tool while visually observing the display device through the touch panel. A demand thus exists for such touch panels that are superior in visibility and reliable in operation.

At present, different types of touch panels, including resistive, capacitive, infrared, and surface acoustic wave, have been developed. The capacitive touch panel has advantages of high accuracy and excellent transparency, and thus has been widely used.

A conventional capacitive touch panel includes a glass substrate, a transparent conductive layer, and four electrodes. The material of the transparent conductive layer is indium tin oxide (ITO) or antimony tin oxide (ATO). The electrodes are made of metal and separately formed on a surface of the transparent conductive layer. Further, a protective layer is formed on the surface of the transparent conductive layer facing away from the substrate. The material of the protective layer has insulative and transparent characteristics.

In operation, an upper surface of the touch panel is contacted by a contact tool such as a user's finger or an electrical pen/stylus. Visual observation of the display of the liquid crystal display device provided behind the touch panel is possible. In use, because of an electrical field of the user, a coupling capacitance is generated between the user and the transparent conductive layer. For high frequency electrical current, the coupling capacitance is a conductor, and thus the contact tool dissipates some current from the contact point. Current through the four electrodes cooperatively replaces current lost at the contact point. The quantity of current supplied by the four electrodes is directly proportional to the distances from the contact point to the electrodes. A touch panel controller calculates the proportion of the four supplied currents, thereby detecting coordinates of the contact point on the touch panel.

The optically transparent conductive layer (for example, ITO layer) is generally formed by means of the relatively complicated ion-beam sputtering method. The ITO layer has generally poor mechanical durability, low chemical resistance, and uneven resistivity over the entire area of the touch panel. Additionally, the ITO layer has relatively low transparency. All the above-mentioned problems of the ITO layer tend to yield a touch panel with limited durability, sensitivity, accuracy, and brightness.

What is needed, therefore, is a durable touch panel with high sensitivity, accuracy, and brightness, and a display device using the same.

SUMMARY

A touch panel includes a substrate, a transparent conductive layer, and a number of electrodes. The substrate includes a first surface. The transparent conductive layer is formed on the first surface. The transparent conductive layer includes a number of carbon nanotube wires. Opposite ends of each carbon nanotube wire are electrically connected to electrodes. Furthermore, a display device using the touch panel is also provided.

Other novel features and advantages of the present touch panel and display device using the same will become more apparent from the following detailed description of the present embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
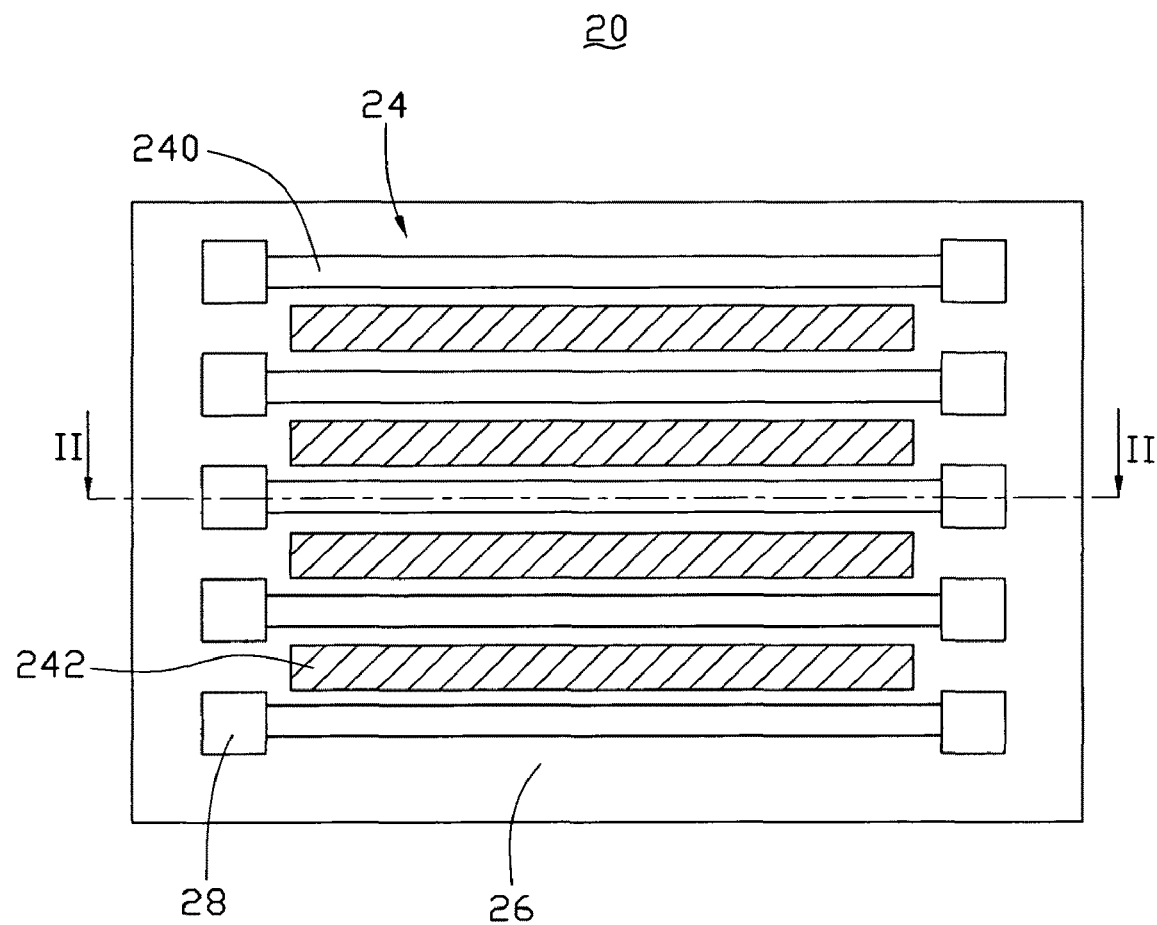
FIG. 1 is a schematic view of a touch panel with two lines of electrodes, in accordance with a present embodiment.

Corresponding reference characters indicate corresponding parts throughout the several views. The exemplifications set out herein illustrate at least one preferred embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 2:
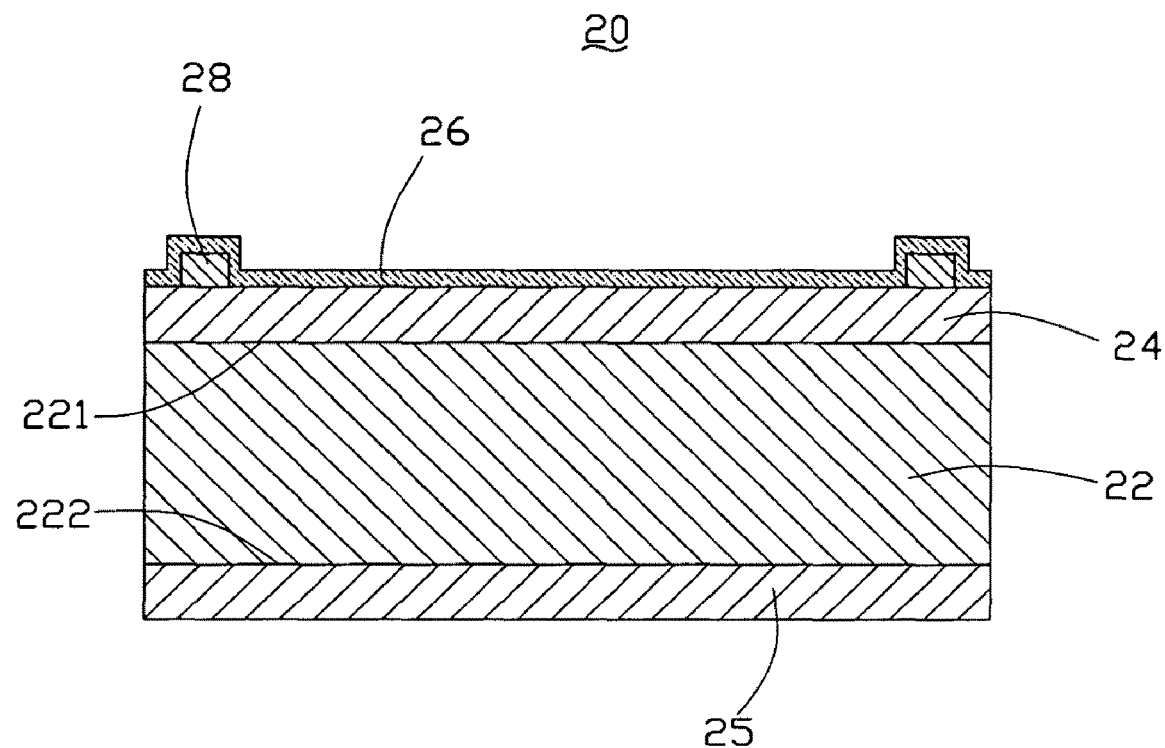
FIG. 2 is a schematic cross section of the touch panel of the present embodiment, taken along a line II-II of FIG. 1.

Referring to FIGS. 1 and 2, a touch panel 20 includes a substrate 22, a transparent conductive layer 24, a transparent protective layer 26, and a plurality of electrodes 28. The substrate 22 has a first surface 221 and a second surface 222 at opposite sides thereof respectively. The transparent conductive layer 24 is disposed on the first surface 221. The transparent conductive layer 24 includes a plurality of substantially parallel carbon nanotube wires 240. The electrodes 28 are arranged in two lines at opposite sides of the transparent conductive layer 24, respectively.

Two ends of each carbon nanotube wire 240 are directly electrically connected to two opposite electrodes 28, with each electrode 28 connected to at least one carbon nanotube wire 240, thereby forming an equipotential surface on the transparent conductive layer 24. There are a plurality of electrode pairs spaced from each other. Each of the plurality of electrode pairs includes two electrodes 240 spaced from and opposite to each other. Each of the plurality of carbon nanotube wires 240 is electrically connected to the two electrodes 240 of the electrode pair. The transparent protective layer 26 covers the electrodes 28 and the exposed surface of the transparent conductive layer 24 facing away from the substrate 22. In the present embodiment, each electrode 28 is connected to only one carbon nanotube wire 240. In another embodiment, each electrode 28 can be connected to several carbon nanotube wires 240.

The substrate 22 has a planar or curved structure. The material of the substrate 22 is glass, quartz, diamond, or plastic. Understandably, the substrate 22 is made from a transparent material, either flexible or stiff, depending on device requirements. The substrate 22 supports the transparent conductive layer 24.

Figure 3:
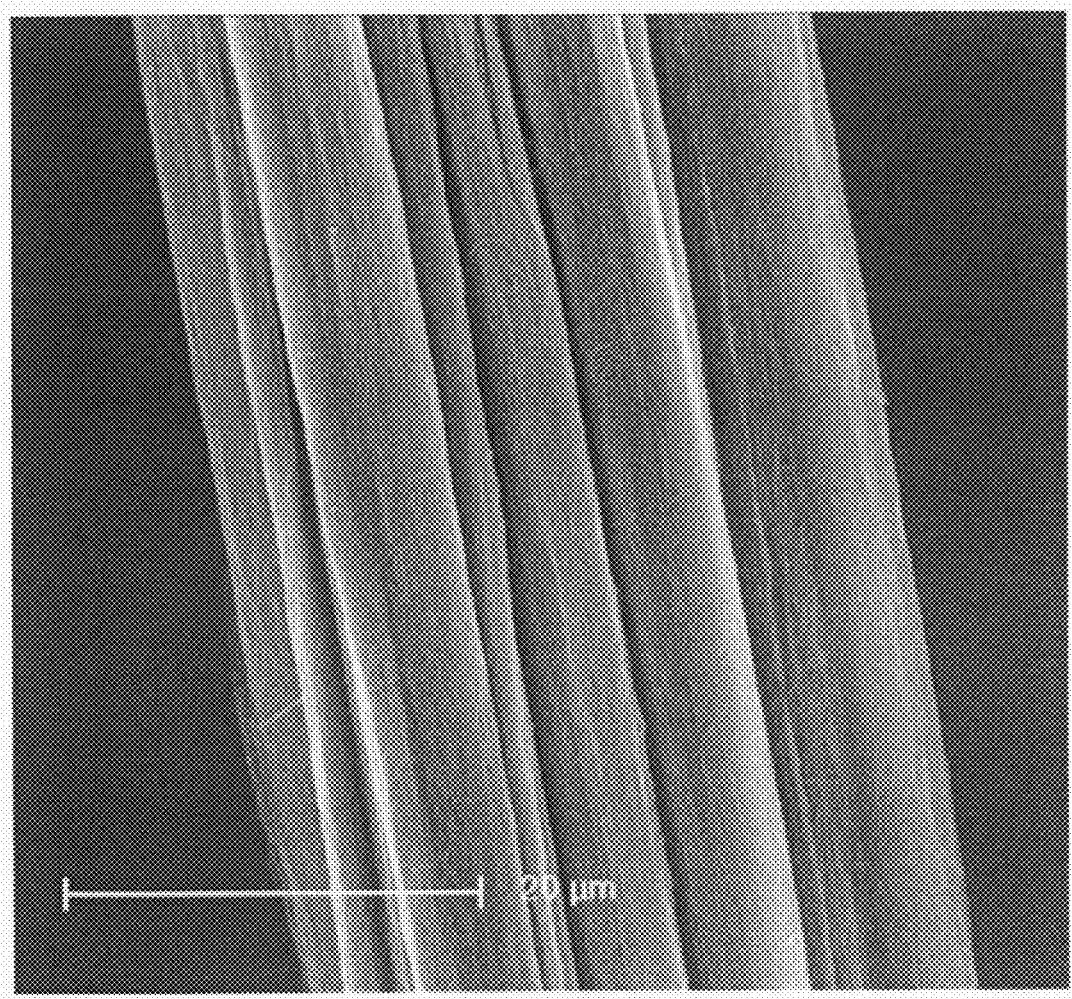
FIG. 3 shows a Scanning Electron Microscope (SEM) image of an untwisted carbon nanotube wire employed in the touch panel of FIG. 1.

The transparent conductive layer 24 includes the plurality of carbon nanotube wires 240. Each carbon nanotube wire 240 includes a plurality of successive carbon nanotubes joined end to end by van der Waals attractive force. Specifically, referring to FIGS. 3 to 5, each carbon nanotube wires 240 comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. It is to be noted that the carbon nanotube segments of the carbon nanotube wires 240 can be untwisted or twisted to form untwisted carbon nanotube wires 240 or twisted carbon nanotube wires 240.

A diameter of each carbon nanotube wire 240 is approximately from 0.5 nanometers (nm) to 100 micrometers (μm) (i.e. approximately 0.5 nm to approximately 100 μm). The carbon nanotubes in the carbon nanotube wires 240 can be single-walled, double-walled, or multi-walled. A diameter of each single-walled carbon nanotube is approximately from 0.5 nm to 50 nm. A diameter of each double-walled carbon nanotube is approximately from 1 nm to 50 nm. A diameter of each multi-walled carbon nanotube is approximately from 1.5 nm to 50 nm. The carbon nanotube wires 240 are separated from one another by a substantially uniform distance, which is approximately in the range from 5 nm to 1 millimeter (mm).

Moreover, for uniform transparency, an optical compensation membrane 242 is disposed between each two adjacent carbon nanotube wires 240. The material of the optical compensation membrane 242 typically has the same optical parameters (e.g. refractive index and transparency) as the transparent conductive layer 24.

A method for fabricating the transparent conductive layer 24 includes the steps of: (a) providing an array of carbon nanotubes, specifically, providing a super-aligned array of carbon nanotubes; (b) pulling out a carbon nanotube structure (carbon nanotube film or carbon nanotube yarn) from the super-aligned array of carbon nanotubes using a tool (for example, adhesive tape, pliers, tweezers, or another tool allowing multiple carbon nanotubes to be gripped and pulled simultaneously); (c) treating the carbon nanotube structure with an organic solvent or mechanical force to form a carbon nanotube wire 240; and (d) spacing a parallel plurality of the carbon nanotube wires 240 on the substrate 22, thereby forming the transparent conductive layer 24.

In step (a), the super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature approximately from 700° C. to 900° C. for about 30 to 90 minutes; (a4) heating the substrate with the catalyst layer to approximately from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In this embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of parallel carbon nanotubes approximately perpendicular to the substrate. The carbon nanotubes in the super-aligned array can be single-walled, double-walled, or multi-walled. A diameter of each single-walled carbon nanotube is approximately from 0.5 nm to 50 nm. A diameter of each double-walled carbon nanotube is approximately from 1 nm to 50 nm. A diameter of each multi-walled carbon nanotube is approximately from 1.5 nm to 50 nm.

The super-aligned array of carbon nanotubes formed under the above conditions is essentially free of impurities such as carbonaceous or residual catalyst particles. The carbon nanotubes in the super-aligned array are densely distributed by van der Waals attractive force.

In step (b), the carbon nanotube structure (film or yarn) can be formed by the substeps of: (b1) selecting one or more carbon nanotubes having a predetermined width from the super-aligned array of carbon nanotubes; and (b2) pulling the carbon nanotubes at an even/uniform speed to form carbon nanotube segments and achieve a uniform carbon nanotube structure. A yarn is a narrow film.

The selected one or more carbon nanotubes have a predetermined width, and can be selected using a tool such as adhesive tape, pliers, or tweezers. The tool contacts the super-aligned array of carbon nanotubes and allows multiple carbon nanotubes to be gripped and pulled simultaneously. The pulling direction can be substantially perpendicular to the growing direction of the super-aligned array of carbon nanotubes.

Figure 5:
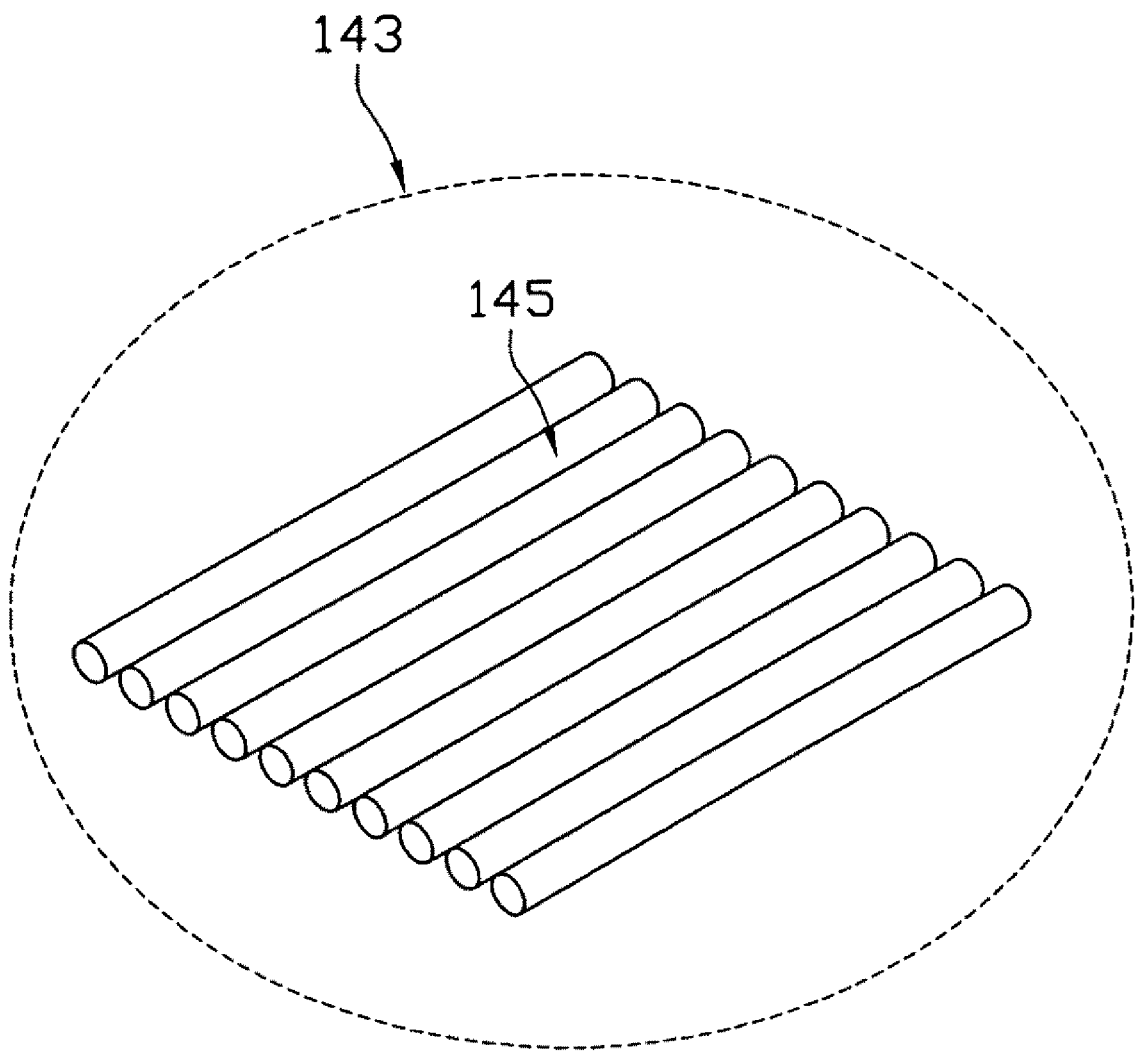
FIG. 5 is a schematic, enlarged view of a carbon nanotube segment in the carbon nanotube film of FIG. 3.

Referring to FIG. 5, more specifically, during the pulling process, as the initial carbon nanotube segments 143 are drawn out, other carbon nanotube segments 143 are also drawn out end to end due to the van der Waals attractive force between ends of adjacent segments 143. This process of drawing ensures a substantially continuous and uniform carbon nanotube structure having a predetermined width can be formed. The carbon nanotube structure includes a plurality of carbon nanotubes 145 joined end to end. The carbon nanotubes 145 in the carbon nanotube structure are all substantially parallel to the pulling/drawing direction of the carbon nanotube structure, and the carbon nanotube structure produced in such manner can be selectively formed to have the predetermined width. The carbon nanotube structure formed by the pulling/drawing method has superior uniformity of thickness and conductivity over a typical disordered carbon nanotube structure. Further, the pulling/drawing method is simple, fast, and suitable for industrial applications.

In step (c), the carbon nanotube structure is soaked in an organic solvent. Specifically, the carbon nanotube structure can be treated by applying organic solvent to the carbon nanotube structure to soak the entire surface of the carbon nanotube structure. Since the untreated carbon nanotube structure comprises a number of carbon nanotubes, the untreated carbon nanotube structure has a high surface area to volume ratio and thus may easily become stuck to other objects. During the surface treatment, the carbon nanotube structure is shrunk into a carbon nanotube wire after the organic solvent is volatilized, due to factors such as surface tension. The surface area to volume ratio and diameter of the treated carbon nanotube structure, now a wire, is reduced. The strength and toughness of the carbon nanotube structure is improved. The organic solvent may be a volatile organic solvent, such as ethanol, methanol, acetone, dichloroethane, chloroform, or any combination thereof. A diameter of each of the carbon nanotube wires 240 is approximately from 0.5 nm to 100 μm.

Figure 4:
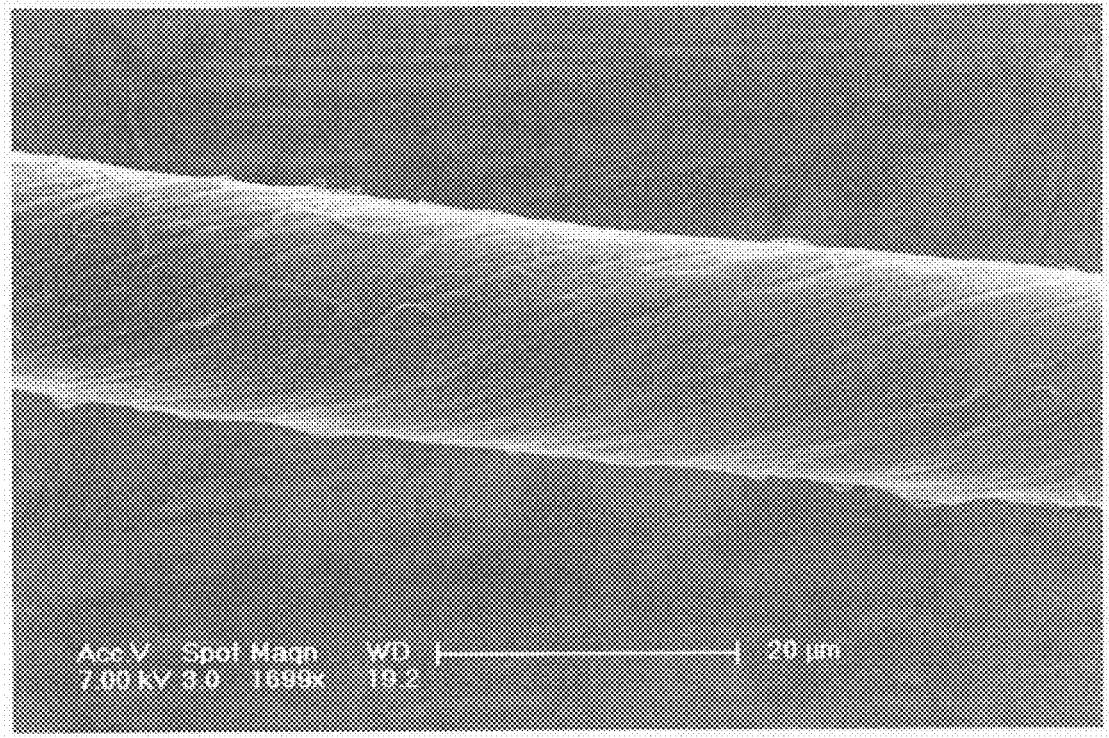
FIG. 4 shows a Scanning Electron Microscope (SEM) image of a twisted carbon nanotube wire employed in the touch panel of FIG. 1.

In step (c), further or alternatively, the carbon nanotube structure can be treated with mechanical force (for example, a conventional spinning process), to acquire a carbon nanotube wire in a twisted shape as shown in FIG. 4.

In step (d), the distances between the carbon nanotube wires 240 can be set according to the desired optical transparency properties of the touch panel 20. In the present embodiment, the distances between the carbon nanotube wires 240 are substantially uniform, and such distance is approximately in range from 5 nm to 1 mm.

In one particular embodiment, the substantially uniform distance between the carbon nanotube wires 240 is approximately in the range from 10 nm to 1 mm, and the carbon nanotube wires 240 are parallel to each other.

It is to be noted that the shape of the substrate 22 and the transparent conductive layer 24 are chosen according to the requirements of the touch field of the touch panel 20. Generally, the shape of the touch field may be triangular or rectangular. In the present embodiment, the shapes of the touch field, the substrate 22, and the transparent conductive layer 24 are all rectangular.

The electrodes 28 are separately disposed. Two ends of each carbon nanotube wire 240 are electrically connected to two opposite electrodes 28. Each electrode 28 is connected to at least one carbon nanotube wire 240, thereby forming an equipotential surface on the transparent conductive layer 24. Specifically, the substrate 22 is typically a glass substrate. The electrodes 28 are strips made of silver, copper, or any alloy of at least one of such metals. In one embodiment, the electrodes 28 are disposed directly on a surface of the transparent conductive layer 24 facing away from the substrate 22. The electrodes 28 are formed by one or more of spraying, electrical deposition, and electroless deposition methods. Moreover, the electrodes 28 can also be adhered to the surface of the transparent conductive layer 24, by, for example, a silver-based slurry.

Further, to prolong operational life span and restrict coupling capacitance of the touch panel 20, the transparent protective layer 26 is disposed on the electrodes 28 and the transparent conductive layer 24. The material of the transparent protective layer 26 can, for example, be silicon nitride, silicon dioxide, benzocyclobutene, polyester film, or polyethylene terephthalate. The transparent protective layer 26 can be a slick plastic film and receive a surface hardening treatment to protect the electrodes 28 and the transparent conductive layer 24 from scratching when in use.

In the present embodiment, the transparent protective layer 26 is silicon dioxide. The hardness and thickness of the transparent protective layer 26 are selected according to system needs. The transparent protective layer 26 is adhered to the transparent conductive layer 24, by, for example, an adhesive.

Figure 6:
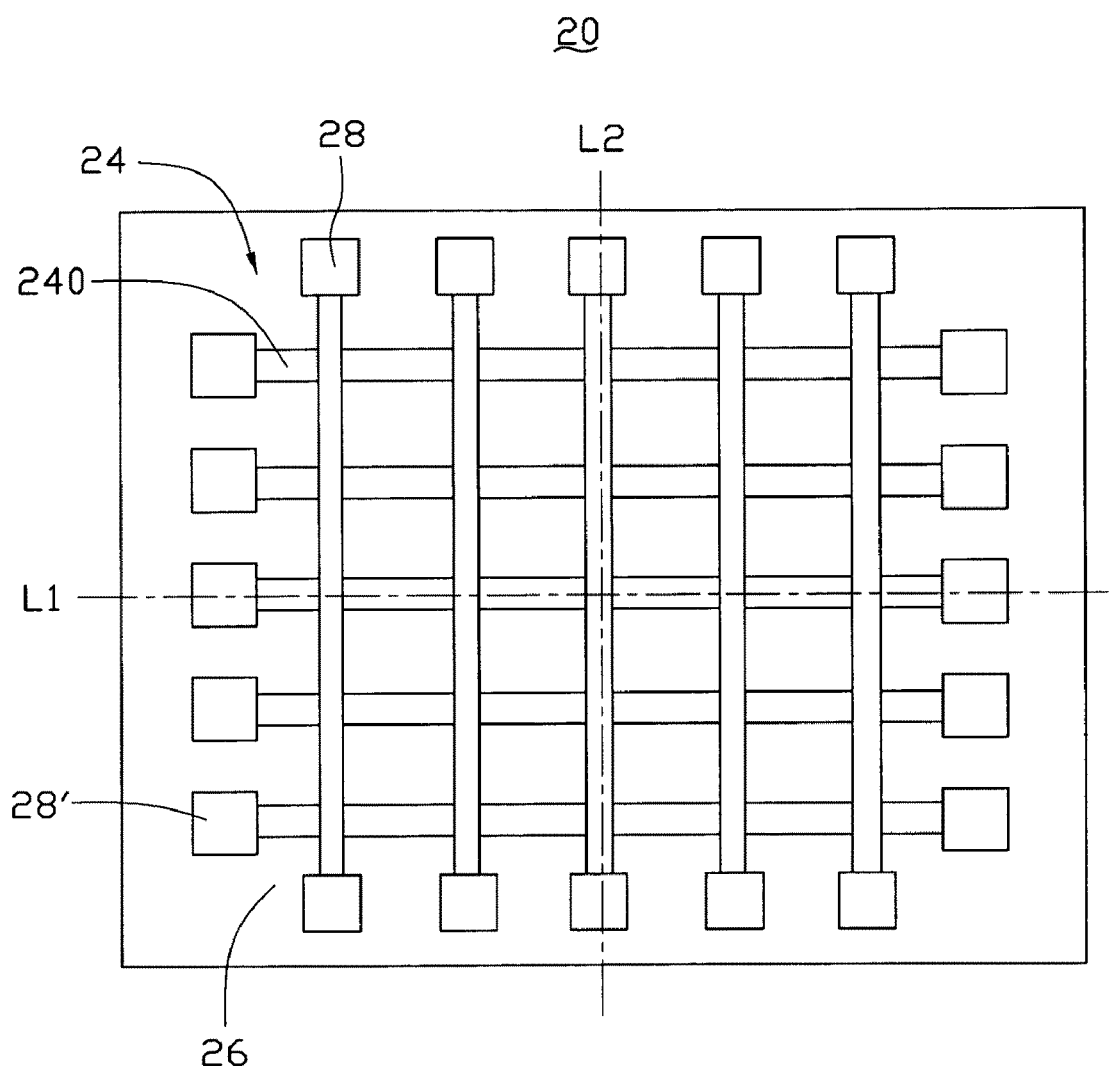
FIG. 6 is a schematic view of a touch panel with four lines of electrodes, in accordance with another present embodiment.

Referring to FIG. 6, in another embodiment, the plurality of electrodes 28 can be set in four lines. Two lines of first electrodes 28 are each arranged parallel to a first axis L1, and two lines of second electrodes 28' are each arranged parallel to a second axis L2. The carbon nanotube wires 240 connected to the first electrodes 28 are arranged parallel to the L2 axis. The carbon nanotube wires 240 connected to the second electrodes 28' are arranged parallel to the L1 axis.

Figure 7:
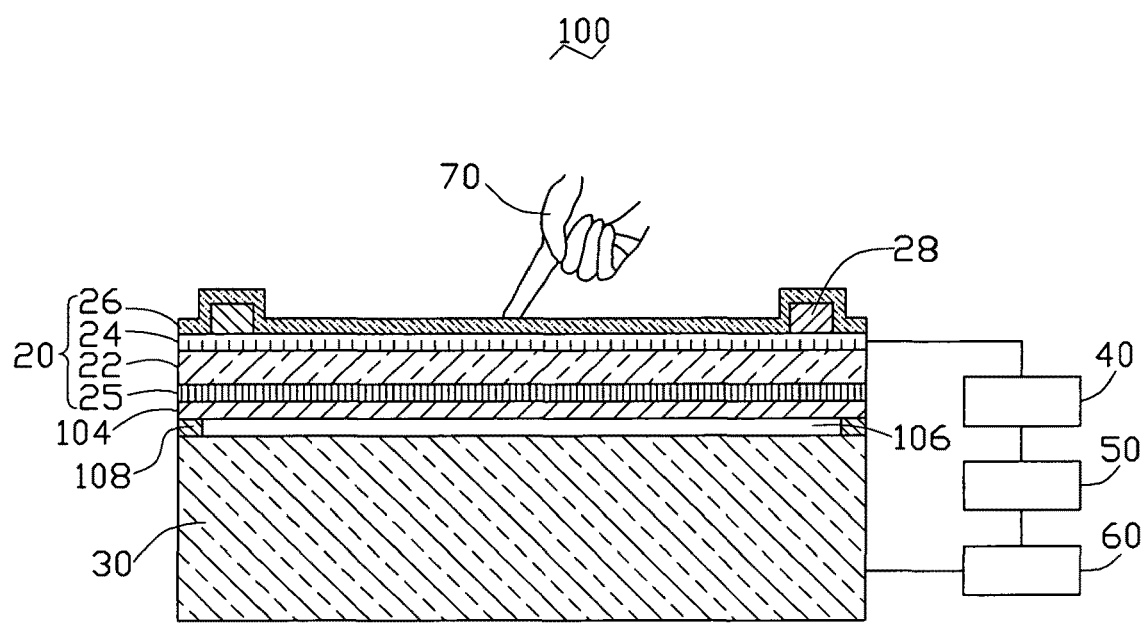
FIG. 7 is a schematic assembled cross section of the touch panel of the present embodiment of FIG. 2 employed with a display element of a display device.

Referring to FIG. 7, a display device 100 includes the touch panel 20, a display element 30, a touch panel controller 40, a central processing unit (CPU) 50, and a display element controller 60. The touch panel 20 is connected to the touch panel controller 40 by an external circuit. The touch panel 20 can be separated a distance 106 from the display element 30 by spacers 108, or installed directly on the display element 30. The touch panel controller 40, the CPU 50 and the display element controller 60 are electrically connected. The CPU 50 is connected to the display element controller 60 to control the display element 30.

The display element 30 can be, for example, a liquid crystal display, field emission display, plasma display, electroluminescent display, vacuum fluorescent display, cathode ray tube, or other display device.

A shielding layer 25 can be further disposed on the second surface 222 of the substrate 22 of the touch panel 20. The material of the shielding layer 25 can be indium tin oxide, antimony tin oxide, carbon nanotube film, and/or another conductive material. In the present embodiment, the shielding layer 25 is a carbon nanotube film. The carbon nanotube film includes a plurality of carbon nanotubes, and the orientation of the carbon nanotubes therein may be arbitrarily determined. In the present embodiment, the carbon nanotubes in the carbon nanotube film of the shielding layer 25 are arranged along the same orientation. The carbon nanotube film is grounded and acts as a shield, enabling the touch panel 20 to operate without interference (for example, electromagnetic interference).

When the shielding layer 25 is disposed on the second surface 222 of the substrate 22, a passivation layer 104 is disposed on a surface of the shielding layer 25 facing away from the substrate 22. The material of the passivation layer 104 can, for example, be silicon nitride or silicon dioxide. The passivation layer 104 can be spaced at a distance from the display element 30 or directly installed on the display element 30. When the passivation layer 104 is spaced from the display element 30 two or more spacers can be used between the passivation layer 104 and the display element 30. Thereby, an air gap is provided between the passivation layer 104 and the display element 30. The passivation layer 104 protect the shielding layer 25 from chemical damage (e.g., humidity of the surrounding) or mechanical damage (e.g., scratching during fabrication of the touch panel).

In operation, voltages are applied to the electrodes 28 respectively. The display device 100 is operated by contacting the transparent protective layer 26 of the touch panel 20 with a contact tool 70, such as a user's finger or an electrical pen/stylus, while visually observing the display element 30 through the touch panel 20. In FIG. 6, the contact tool is the user's finger 70. Due to an electrical field of the user, a coupling capacitance forms between the user and the transparent conductive layer 24. For high frequency electrical current, the coupling capacitance is a conductor, and thus the contact tool 70 diffuses some current from the contact point. Current passing through the electrodes 28 cooperatively replaces the current lost at the contact point. The quantity of current supplied by each of the electrodes 28 is directly proportional to the distance from the contact point to the electrode 28. The touch panel controller 40 calculates the proportion of the supplied currents, and thereby detects coordinates of the contact point on the touch panel 20. The touch panel controller 40 sends the coordinates of the contact point to the CPU 50, where they are received and processed into a command, before being sent to the display element controller 60. The display element controller 60 controls the display of the display element 30 accordingly.

The carbon nanotubes exhibit superior toughness, high mechanical strength, and uniform conductivity in the carbon nanotube wires 240. Thus the touch panel 20 and the display device 100 utilizing the carbon nanotube wires 240 as the transparent conductive layer 24 are durable and highly conductive. Furthermore, since the carbon nanotubes have excellent conductive properties, the transparent conductive layer 24 formed with a plurality of parallel, separated carbon nanotube wires 240 provides a uniform resistive distribution, thereby improving the sensitivity and accuracy of the touch panel 20 and the display device 100.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:
1. A touch panel comprising:
a substrate comprising a first surface;
a transparent conductive layer located on the first surface, the transparent conductive layer comprising a plurality of carbon nanotube wires; and
a plurality of electrodes separately disposed from each other, two opposite ends of each of the plurality of carbon nanotube wires being directly and electrically connected to two of the plurality of electrodes.
2. The touch panel as claimed in claim 1, wherein each of the plurality of electrodes is connected to only one carbon nanotube wire of the plurality of carbon nanotube wires.
3. The touch panel as claimed in claim 1, wherein a diameter of each of the plurality of carbon nanotube wires is approximately from 0.5 nanometers to 100 micrometers.
4. The touch panel as claimed in claim 1, wherein the plurality of carbon nanotube wires are separated from each other, and distances between adjacent two of the plurality of carbon nanotube wires are approximately from 5 nanometers to 1 millimeter.
5. The touch panel as claimed in claim 1, wherein each of the plurality of carbon nanotube wires comprises a plurality of successive carbon nanotube segments joined end to end by van der Waals attractive force therebetween, and each of the carbon nanotube segments comprises a plurality of carbon nanotubes parallel to each other.
6. The touch panel as claimed in claim 1, wherein the plurality of electrodes comprises at least four sets of electrodes, each of the four sets of electrodes comprises a plurality of electrodes separately disposed from each other, two of the four sets of electrodes being at two opposite sides of the first surface of the substrate, the other two of the four sets of electrodes being at another two opposite sides of the first surface of the substrate.

7. The touch panel as claimed in claim 1, wherein the plurality of electrodes are metal electrodes adhered to a surface of the transparent conductive layer by a silver-based slurry.

8. The touch panel as claimed in claim 1, further comprising a transparent protective layer disposed on the plurality of electrodes and a surface of the transparent conductive layer.

9. The touch panel as claimed in claim 1, further comprising at least one optical compensation membrane disposed between adjacent two of the plurality of carbon nanotube wires.

10. The touch panel as claimed in claim 1, wherein a material of the substrate is selected from the group consisting of glass, quartz, diamond, and plastic.

11. The touch panel as claimed in claim 1, further comprising a shielding layer, wherein the substrate further comprises a second surface, and the shielding layer is disposed on the second surface of the substrate.

12. The touch panel as claimed in claim 11, wherein a material of the shielding layer is selected from the group consisting of indium tin oxides, antimony tin oxides, and carbon nanotube films.

13. The touch panel as claimed in claim 1, wherein the touch panel is planar or curved.

14. A display device comprising:
a touch panel comprising:
a substrate comprising a surface;
a transparent conductive layer formed on the surface of the substrate, the transparent conductive layer comprising a plurality of carbon nanotube wires; and
a plurality of electrode pairs spaced from each other, each of the plurality of electrode pairs comprising two electrodes spaced from and opposite to each other, and each of the plurality of carbon nanotube wires electrically connected to the two electrodes; and
a display element adjacent to the touch panel.

15. The display device as claimed in claim 14, further comprising a touch panel controller, a central processing unit, and a display element controller electrically connected to each other, with the touch panel controller connected to the touch panel and the display element controller connected to the display element.

16. The display device as claimed in claim 14, further comprising a passivation layer disposed on a surface of the touch panel, with the passivation layer and the transparent conductive layer being at opposite sides of the substrate, the passivation layer comprising one of silicon nitride and silicon dioxide.

17. The display device as claimed in claim 14, wherein each of the plurality of carbon nanotube wires directly and electrically connects to the two electrodes at two opposite ends of the each of the plurality of carbon nanotube wires.

18. The display device as claimed in claim 17, wherein the plurality of carbon nanotube wires are spaced from each other.

19. A touch panel comprising:
a substrate comprising a surface;
a transparent conductive layer located on the surface, the transparent conductive layer comprising
a plurality of first carbon nanotube wires substantially parallel to each other; and
a plurality of first electrodes separately disposed on the surface and arranged in one line at one side of the transparent conductive layer, ends of the plurality of first carbon nanotube wires are directly and electrically connected to the plurality of first electrodes.

20. The touch panel as claimed in claim 19, further comprising a plurality of second electrodes separately disposed on the surface and arranged in another line at another side of the transparent conductive layer, the transparent conductive layer further comprising a plurality of second carbon nanotube wires substantially parallel to each other, the plurality of second carbon nanotube wires cross with the plurality of first carbon nanotube wires, ends of the plurality of second carbon nanotube wires are directly and electrically connected to the plurality of second electrodes.

* * * * *